United States Patent [19]

Bauer et al.

[11] Patent Number: 4,655,180

[45] Date of Patent: Apr. 7, 1987

[54] ADJUSTING DEVICE FOR ADJUSTING A STOP COUPLED WITH A CONTROL DEVICE OF AN INTERNAL COMBUSTION ENGINE

[75] Inventors: Peter-Josef Bauer, Bühl; Erik Männle, Oberkirch; Kurt Rapp, Bühl; Hans-Peter Schemel, Achern; Lothar Schmidt, Bühl, all of Fed. Rep. of Germany

[73] Assignee: Robert Bosch GmbH, Stuttgart, Fed. Rep. of Germany

[21] Appl. No.: 832,189

[22] Filed: Feb. 24, 1986

[30] Foreign Application Priority Data

May 30, 1985 [DE] Fed. Rep. of Germany ....... 3519324

[51] Int. Cl.$^4$ ........................ F02M 3/07; F02D 41/00
[52] U.S. Cl. ..................................... 123/361; 123/399
[58] Field of Search ............... 123/361, 399, 339, 352; 180/178, 179

[56] References Cited

U.S. PATENT DOCUMENTS

| | | | |
|---|---|---|---|
| 4,192,398 | 3/1980 | Hunt | 123/361 X |
| 4,212,272 | 7/1980 | Hawk | 123/361 X |
| 4,363,303 | 12/1982 | Takayama | 123/339 |
| 4,436,069 | 3/1984 | Collonia | |
| 4,455,978 | 6/1984 | Atago et al. | 123/361 X |
| 4,539,955 | 9/1985 | Wilson et al. | 123/339 |

Primary Examiner—Tony M. Argenbright
Attorney, Agent, or Firm—Edwin E. Greigg

[57] ABSTRACT

An adjusting device for adjusting a stop lever coupled with a control device of an internal combustion engine. The adjusting device includes a housing having an electric motor which via a worm gear rotates a gear wheel. An internal thread is provided in an inner bore of the gear wheel and is engaged by the external thread of a spindle. The spindle is joined to an actuating sleeve and on one end has struts extending in the axial direction, which protrude into guide grooves of a short tubular portion of the bottom part of the housing and are displaceable therein in order to secure the spindle against rotation. A feeler is slidably disposed in the actuating sleeve and when the stop lever of the control device is in contact with the feeler, the feeler closes switch contacts which communicate via wiper fingers with contact paths, which are disposed on a protuberance which extends into the spindle.

5 Claims, 2 Drawing Figures

ADJUSTING DEVICE FOR ADJUSTING A STOP COUPLED WITH A CONTROL DEVICE OF AN INTERNAL COMBUSTION ENGINE

BACKGROUND OF THE INVENTION

The invention is based on an adjusting device as generally defined hereinafter. An adjusting device is already known in which the rotary motion of the electric motor is converted by a worm gear into a displacement movement of the actuating sleeve. This has the disadvantage that the worm gear cannot displace the actuating pin sufficiently accurately, and that because of the force exerted by the control device stop on the actuating pin, undesirably great frictional forces must be overcome in the worm gear by the electric motor.

OBJECT AND SUMMARY OF THE INVENTION

The adjusting device according to the invention has the advantage over the prior art that the actuating sleeve and hence the control device stop can be adjusted very accurately, and forces exerted by the control device stop against the actuating sleeve do not affect the gear provided between the electric motor and the actuating sleeve, so that a rapid adjustment of the control element, independent of counterforces, is assured.

The characteristics recited herein enable advantageous modifications of and improvements to the adjusting device Further characteristics offer the advantage that in the event of unintentional, defective operation, bending or self-locking of the screw thread provided between the spindle and the worm wheel beyond the structurally defined adjustment path of the actuating pin is not possible Other characteristics make it possible to recognize whether the control device stop is in contact with the actuating pin.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
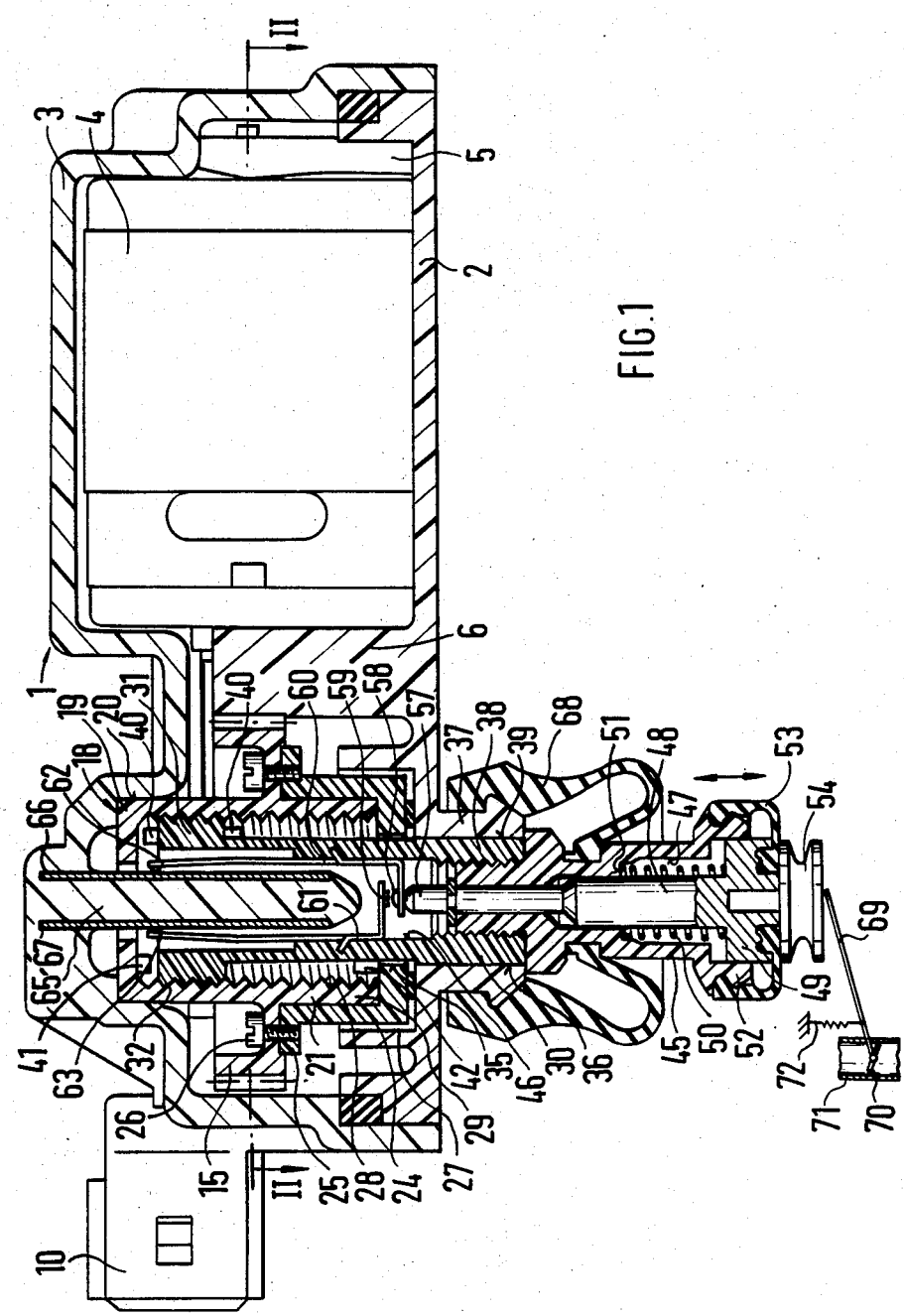
FIG. 1, is a section taken through an adjusting device along the line I—I of FIG. 2 which shows an exemplary embodiment of the invention.
Figure 2:
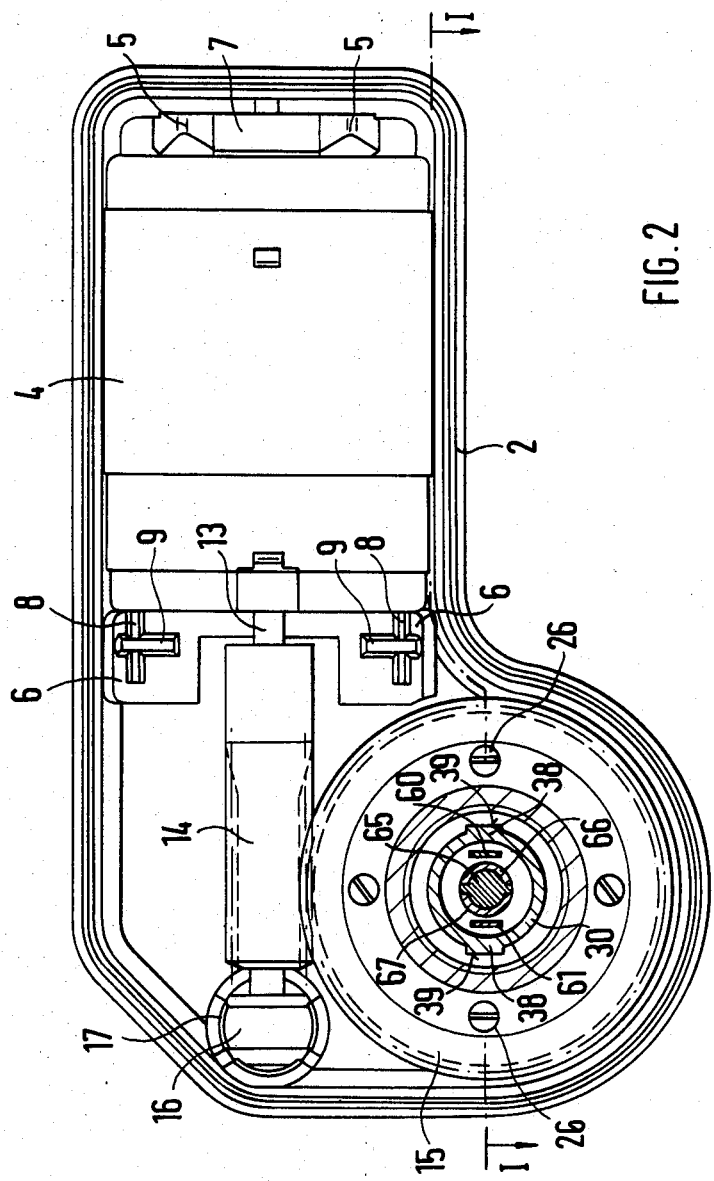
FIG. 2 is a section taken along the line II—II of FIG. 1.

The adjusting device 1 shown in FIGS. 1 and 2 includes a housing having a bottom part 2 and a cap 3. The housing and other elements, except those that require an electrically conductive material, are made of an electrically non-conductive material. An electric motor 4 is disposed in the bottom part 2, being axially supported between first retaining struts 5, on one end, and second retaining struts 6 on the other; the first retaining struts 5, grip partway around a cylindrical retention support 7 of the electric motor 4 in a clamp-like fashion. The electric motor 4 is electrically connected via connecting lugs 8, which can be bonded to contact conductors 9. The contact conductors 9 lead to a plug 10, which can be electrically connected to an electronic control unit, not shown. A worm gear 14 is connected to the drive shaft 13 of the electric motor 4 and engages a gear wheel 15 to rotate the gear wheel 15. The end of the drive shaft 13 remote from the electric motor 4 is rotatably supported in a bearing body 16, which is supported in turn in a bearing extension 17 of the bottom part 2. To support the gear wheel, the hub 18 of the gear wheel 15 protrudes with a bearing step 19 into a bearing opening 20 of the cap 3. The hub 18 also has a cylindrical extension 21, which is disposed on the side of the gear wheel 15 remote from the bearing step 19. An apertured cap 24 provided with a flange 25 is fitted onto the extension 21, on the gear wheel 15 and is secured thereto by screws 26. The cap 24 is supported in a bearing opening 27 of the bottom part 2. The hub 18 of the gear wheel 15 has an inner longitudinal bore 28, which is provided with an internal thread 29. Protruding into the inner bore 28 of the hub 18 is a spindle 30, having a threaded upper end portion 31 which is provided with an external thread 32 that cooperates with the internal thread 29 of the hub 18. The end of spindle 30 remote from the threaded portion 31 protrudes through an opening 35 in the cap 24 and through a guide opening 36 of a short tubular portion 37 which protrudes from the bottom part 2. At the circumference of the spindle 30, there is at least one raised strut 38 arranged to extend in the axial direction of the spindle 30, thereby to engage a guide groove 39 of the guide opening 36 such that the spindle 30 is supported with the struts 38 in the guide opening having the guide grooves 39 such that spindle 30 can be displaced but is secured against twisting. In the present exemplary embodiment, there are two struts 38 on the spindle 30 and two guide grooves 39 in the guide opening 36. If the gear wheel 15 is turned by the worm gear 14, the spindle 30 is forced to a variable extent out of the gear wheel 15, because of its external thread 32 that engages the internal thread 29 of rotating gear wheel 15. To prevent binding or locking of the spindle 30 relative to the gear wheel 15 beyond the structural displacement path of the spindle 30 in the event of unintended or defective operation, a stop tab 40 is disposed on each side of the threaded portion 31 of the spindle 30. A stop tab 41 which protrudes downwardly into the inner bore 28 is also provided on the bearing step 19 of the hub 18, and a further stop tab 42 which protrudes upward into the inner bore 28 from the extension step 21 is provided on the cap 24. The stop tabs 40, 41 and 40, 42 enter into rotational engagement with one another at the various structurally predetermined terminal positions of the spindle 30 and block any further adjusting movement, without locking the worm wheel 15 and spindle 30 together. An actuating sleeve 45 is joined to the spindle 30 such that it can project out of the tubular portion 37 and is provided with threads on its end which is screwed into a thread of a through opening 46 of the spindle 30. A feeler 48 is slidably supported in a stepped bore 47 of the actuating sleeve 45. On the end remote from the spindle 30, the feeler 48 is provided with a head 49 on which a restoring spring 50 is supported, and the other end of the spring rests on a step 51 of the stepped bore 47. Between the end 52 of the actuating sleeve 45 oriented toward the head 49 of the feeler 48 and the head 49 itself, there is a sealing sleeve 53, which is held onto the head 49 by a stop plate 54 joined to the head 49. The contact end 57 of the feeler 48 remote from the head 49 protrudes into the through opening 46 of the spindle 30 and terminates in proximity to points at a switch, which is formed by a first switch contact 58 and a second switch contact 59 which can be closed if the feeler 48 is displaced toward the first switch contact 58 counter to the force of the restoring spring 50. The first switch contact 58 is connected to a first electrical conductor 60 and the second electrical switch contact 59 is connected to a second electrical conductor 61. The electrical conductors 60, 61 are guided and retained, opposite one another, in the through opening 46 of the spindle 30. The first electrical conductor 60 terminates at a first wiper finger 62, and the second electrical conductor 61 terminates at a second wiper finger 63. A protuberance or tang 65 formed on the lid 3 extends down into the through opening 46 of the spindle 30 and has a first electrically conductive contact path 66 and a second oppositely disposed electrically conductive contact path 67, which are electrically insulated from one another. On the outer end, the contact paths 66, 67 lead to the plug 10. The first wiper finger 62 rests positively on the first contact path 66, and the second wiper finger 63 rests positively on the second contact path 67. Thus upon an axial displacement of the spindle 30, any electrical contact existing between the wiper fingers 62, 63 and the contact paths 66, 67 can be maintained. A further sealing sleeve 68 is disposed between the short tubular portion 37 and the actuating sleeve 45.

The feeler 48 of actuating sleeve 45 points at a stop lever 69 of a control device 70, which for instance is a throttle valve 70 disposed in the intake tube 71 of an internal combustion engine. The stop lever 69 is urged toward the stop plate 54 of feeler 48 by a spring 72. When the stop lever 69 is in contact with the stop plate 54, the feeler 48 is displaced counter to the force of the restoring spring 50 in the actuating sleeve 45 and the contact end 57 of feeler 48 closes the switch contacts 58, 59, whereupon a current circuit sent via the electronic control unit can be closed. Triggering the electric motor 4 rotates the drive shaft 13, causing the worm 14 to rotate the gear wheel 15, so that the spindle 30 executes an axial movement, which adjusts the stop 69 to a variable extent when the stop lever 69 is resting on the contact plate 54. This kind of adjustment of the stop lever 69 for controlling the control device 70 can be effected in an internal combustion engine, for example, in order to regulate engine idling, or to enable enrichment of the fuel-air mixture during cold starting, using the control device 70.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A control device for an internal combustion engine adapted to actuate a throttle valve in an intake manifold comprising power means arranged to transform rotary motion through plural gear means into linear motion, one of said gear means having a rotatable hub portion threadly engaging gear means of a spindle, spaced electrical wiper means including electrical contacts carried by said spindle means projecting from a cap member into said hub means and said spindle, said last named means having oppositely disposed electrical contact paths which are engaged by said wiper means and stop means to prevent locking of said gear means during linear movement of said spindle.

2. An adjusting device having a housing, for adjusting a stop lever coupled with a control device of an internal combustion engine, an actuating sleeve that is adjustable by an electric motor being oriented toward said stop lever, characterized in that a worm gear serves to convert the rotation motion generated by the electric motor into a linear movement of the actuating sleeve, said electric motor includes a drive shaft which rotates a worm gear that cooperates with a gear wheel, said gear wheel includes an inner bore with an internal thread, a spindle having an externally threaded upper end engaged by the internal thread of said inner bore of said gear wheel and a bottom end including at least one strut extending in the axial direction in which said strut secures the spindle against twisting protrudes into a guide groove of the housing which secures said spindle from rotating during linear movement by said gear wheel and an actuating sleeve joined to said at least one strut of said spindle.

3. An adjusting device as defined by claim 2, which includes stop tabs disposed on said spindle which cooperates with stop tabs on said gear wheel that define a linear displacement movement of the spindle relative to the gear wheel.

4. An adjusting device as defined by claim 2, in which said actuating sleeve includes a stepped bore, a feeler supported in said stepped bore of said actuating sleeve which is displaceable counter to the force of a restoring spring, said feeler including an inner contact end and an outer end to which a stop means is secured and when said stop lever is in contact with said stop means said contact end of said feeler remote from said stop lever closes an electrical switch secured to said spindle and movable therewith.

5. An adjusting device as defined by claim 4, in which said switch includes two electrically conductive wiper fingers with each wiper finger in positive contact with an electrically conductive contact path.

* * * * *